(12) United States Patent  
Aoki et al.

(10) Patent No.: US 8,416,475 B2
(45) Date of Patent: Apr. 9, 2013

(54) MEDIUM TRANSPORT DEVICE AND IMAGE PROCESSING APPARATUS

(75) Inventors: Takeshi Aoki, Matsumoto (JP); Ryo Honma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 398 days.

(21) Appl. No.: 12/914,496

(22) Filed: Oct. 28, 2010

(65) Prior Publication Data

US 2011/0103865 A1  May 5, 2011

(30) Foreign Application Priority Data

Oct. 29, 2009  (JP) .................. 2009-249151

(51) Int. Cl.
*H04N 1/04* (2006.01)
*B41J 15/00* (2006.01)
*B41J 11/00* (2006.01)
*B41J 13/00* (2006.01)
*B41J 13/08* (2006.01)

(52) U.S. Cl. ........ 358/498; 358/474; 358/490; 358/497; 400/578; 400/579; 400/611; 400/637; 400/642

(58) Field of Classification Search .................. None
See application file for complete search history.

(56) References Cited

U.S. PATENT DOCUMENTS

2005/0058480 A1* 3/2005 Ohashi et al. ............... 400/55
2005/0261105 A1* 11/2005 Kato ....................... 475/331

FOREIGN PATENT DOCUMENTS

JP  2004-002024  1/2004
JP  2007-230657  9/2007

\* cited by examiner

*Primary Examiner* — Benny Q Tieu
*Assistant Examiner* — Haris Sabah
(74) *Attorney, Agent, or Firm* — Workman Nydegger

(57) ABSTRACT

In a state where a second power transmission path of transmitting power from the second planetary gear to the cam driving gear through the intermediate gear is selected, when the intermediate gear is opposed to the non-tooth portion for the release position of the cam driving gear, the rotation direction of the driving motor is changed to select a first power transmission path of directly transmitting power from the first planetary gear to the cam driving gear, the non-tooth portion for the release position deviates from the opposed position of the intermediate gear, and the rotation direction of the driving motor is changed again to select the second power transmission path.

6 Claims, 15 Drawing Sheets

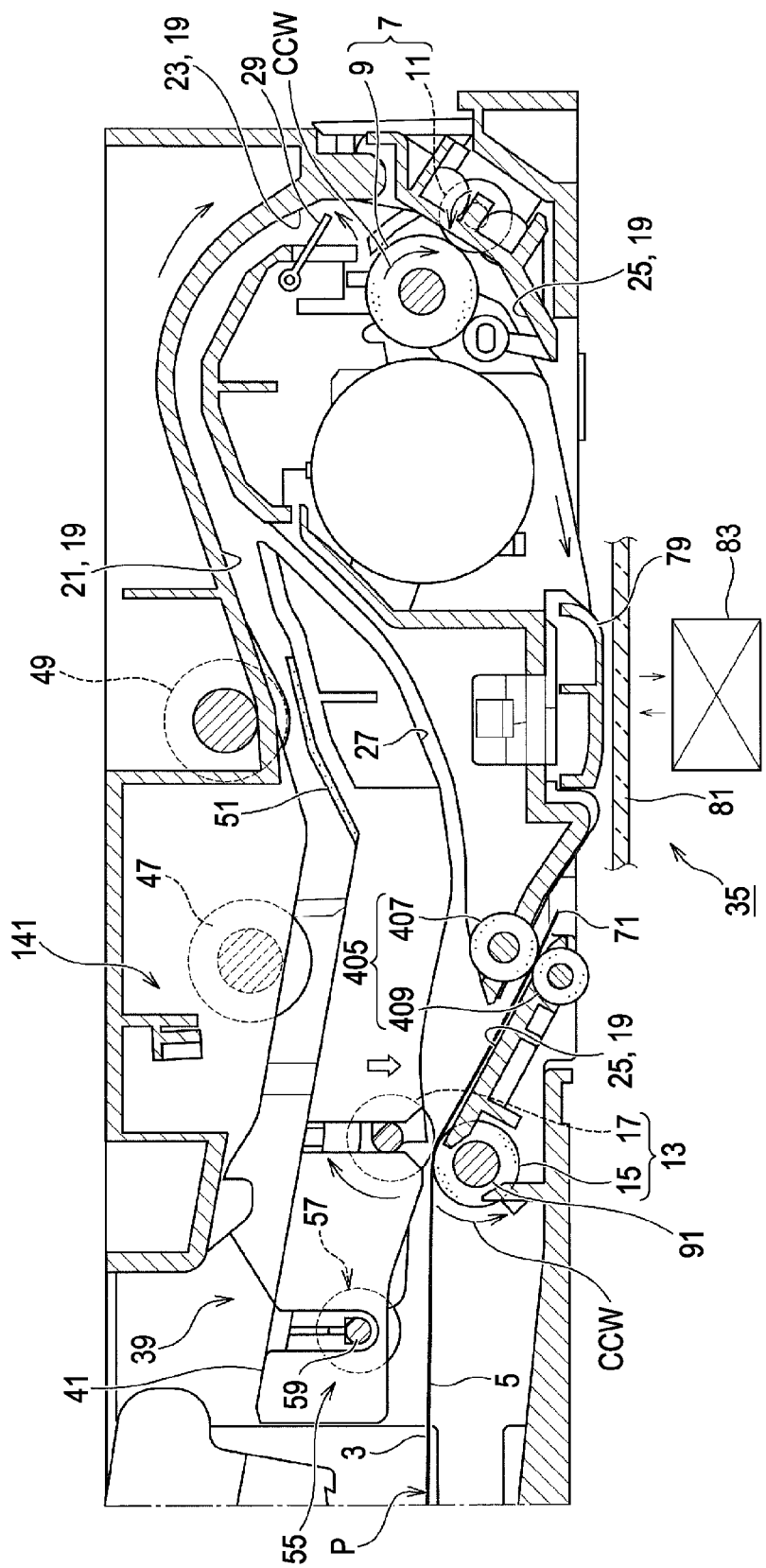

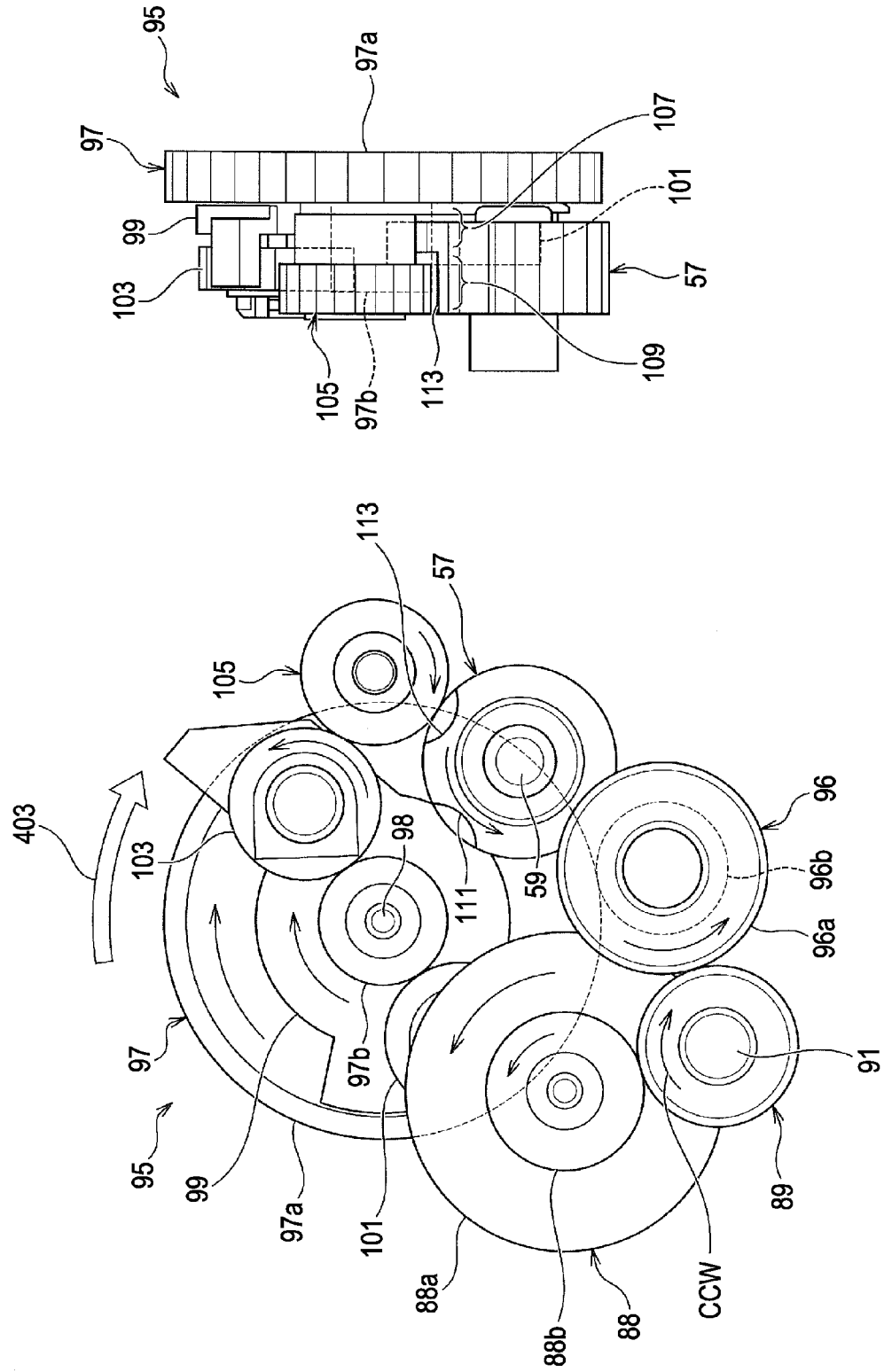

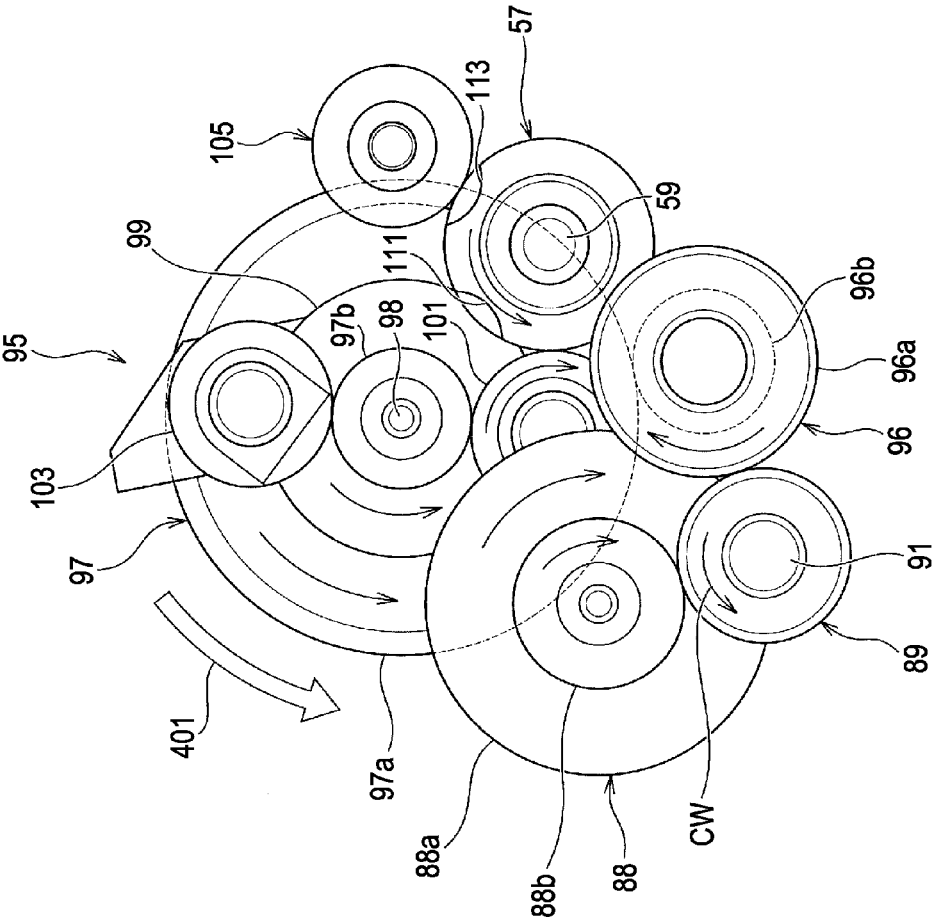
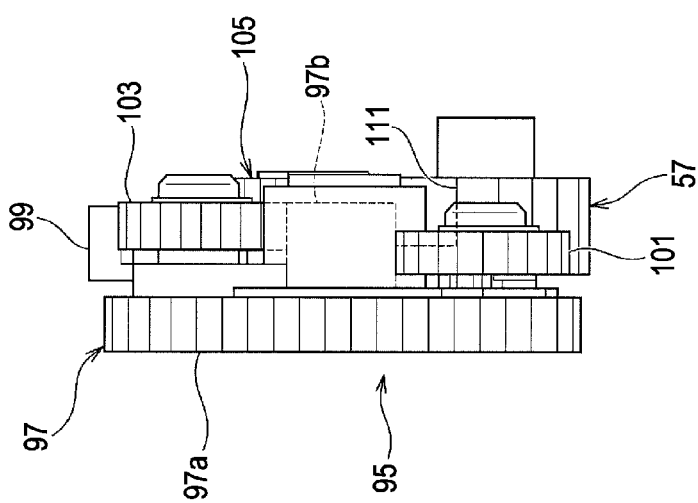
FIG. 12A
FIG. 12B

MEDIUM TRANSPORT DEVICE AND IMAGE PROCESSING APPARATUS

BACKGROUND

1. Technical Field

The present invention relates to a medium transport device which reverses an upside and a downside of a medium such as paper transported by a transport roller with a first face facing toward one direction, by switching of forward rotation and reverse rotation of a discharge roller, to transport the medium with a second face of the medium facing toward the one direction, and more particularly, to a medium transport device and an image processing apparatus provided with the medium transport device to perform switching of a nip state and a release state of the discharge roller at the optimal time irrespective of differences in the lengths of the mediums.

2. Related Art

As described in JP-A-2007-230657, an image reading apparatus such as a photocopier, a facsimile, and a scanner provided with an auto document feeder as an example of a medium transport device has been already developed. Such an image reading apparatus is provided with an image reading device capable of continuously reading image information printed on both front and back faces of a medium (hereinafter, referred to as "paper"), and the image reading device guides paper fed with the first face facing upward, to a semi-loop-shaped transport path on which a transport roller and a discharge roller are provided, to read an image of a first face with the first face facing downward.

Then, the paper is allowed to enter a reverse path with the transport direction switched, and the paper is transported with a second face, which is opposite to the first face, facing downward by guiding it to the transport path again to read an image of the second face.

The switching of the transport direction of the paper and the switching of the nip state and the release state of the discharge roller, which are necessary to perform continuous image reading of the first face and the second face of the paper, are performed in a fixed operation time preset by a medium transport device (hereinafter, referred to as "paper transport device").

The paper transport path gets smaller and shorter as the image reading apparatus gets smaller. Accordingly, when paper with a long paper length is transported, missing occurs between a paper sent to the reverse path and a paper discharged from the transport path to the outside, at the nip position of the discharge roller at the second face transport time. Thus, the discharge roller is allowed to be in the release state when the missing occurs, to allow the missing to occur.

However, when the switching of the transport direction of paper and the switching of the nip state and the release state of the discharge roller are performed by one driving motor, such an operation time becomes a fixed time determined by a deceleration ratio of gear rows and the like. Accordingly, the length of paper on which the first face transport and the second face transport are continuously performed is limited to a fixed range (for example, A4 length size to letter length size). Therefore, conventional paper transport devices cannot cope with paper with a length in a wide range in which the length of paper is, for example, A4 width size to a size of 17 inch (210 mm to 432 mm) since there is also the problem of the missing.

The switching of the nip state and the release state of the discharge roller can be performed by separate power separated from the power of the transport roller or the discharge roller, for example, a solenoid disclosed in JP-A-2004-2024.

However, the number of components is increased or the structure becomes complicated, thereby raising costs of the paper transport device.

SUMMARY

An advantage of some aspects of the invention is to cope with various mediums, which have a wide range of transport direction lengths, in a medium transport device transporting the medium by switching the nip state and the release state of the discharge roller.

According to a first aspect of the invention, there is provided a medium transport device provided with a reverse path and a transport path disposed in a loop shape such that a medium fed toward a nip point of a transport roller by a discharge roller passes through the nip point and returns to a nip position of the discharge roller again, the medium transport device including: a driving motor that rotates forward and in reverse; a cam driving gear that is provided with a partial tooth portion having a non-tooth portion for a release position at a part of a circumferential face and a whole tooth portion provided with teeth on the whole circumferential face; an intermediate gear that is provided at a position engaged with the partial tooth portion of the cam driving gear; a planetary gear mechanism that is provided with a first planetary gear engaged with the whole tooth portion of the cam driving gear to transmit power when the driving motor is rotated in one direction, and a second planetary gear engaged with the intermediate gear to transmit power of rotation in the same direction as that of the first planetary gear to the partial tooth portion of the cam driving gear when the driving motor is rotated in the other direction; and a nip-release switching mechanism that switches a nip state and a release state of the discharge roller by the rotation position of the cam driving gear, wherein in a state where a second power transmission path of transmitting power from the second planetary gear to the cam driving gear through the intermediate gear, when the intermediate gear is opposed to the non-tooth portion for the release position of the cam driving gear, the rotation direction of the driving motor is changed to select a first power transmission path of directly transmitting power from the first planetary gear to the cam driving gear, the non-tooth portion for the release position deviates from the opposed position of the intermediate gear, and the rotation direction of the driving motor is changed again to select the second power transmission path.

According to the aspect, the non-tooth portion for the release position provided at the partial tooth portion of the cam driving gear is opposed to the intermediate gear, and thus it is possible to block the power transmitted from the second planetary gear to the cam driving gear through the intermediate gear. Accordingly, since the discharge roller is kept in the release state while the power is blocked, it is possible to cope with mediums having various transport-direction lengths. Therefore, it is possible to miss the medium at the nip position of the discharge roller.

The rotation direction of the driving motor is switched in the power blocked state, the power is transmitted from the first planetary gear to the whole tooth portion of the cam driving gear, and thus it is possible to exclude the non-tooth portion for the release position from the opposed position of the intermediate gear. Accordingly, when the rotation direction of the driving motor is switched again after the non-tooth portion for release position is excluded from the opposed position of the intermediate gear, the discharge roller enters the nip state and it is possible to discharge the medium to the outside of the transport path by the rotation in the same direction.

According to a second aspect of the invention, in the medium transport device of the first aspect, the time of switching from the second power transmission path to the first power transmission path is set on the basis of detection information of a detection sensor that detects a transport rear end position of the medium during transport.

According to the aspect, it is possible to switch from the release state to the nip state of the discharge roller at the optimal time with respect to the medium, irrespective of differences in the transport direction lengths of the mediums. Therefore, the switching from the release state to the nip state of the discharge roller is performed at a faster time to the degree to which the transport direction length of the medium is short.

According to a third aspect of the invention, in the medium transport device of the first aspect or the second aspect, an intermediate roller that is formed of a pair of nip rollers and is capable of rotating forward and in reverse is provided on a transport path on a downstream side of the transport roller from the nip point of the transport roller to the nip position of the discharge roller.

According to the aspect, even when the rear end of the medium passes through the nip point of the transport roller, it is possible to stop transporting the medium before it passes through the nip point of the intermediate roller. Therefore, it is possible to cope with the medium which has a transport direction length which is shorter than a length of the transport path between the nip point of the discharge roller and the nip position of the discharge roller on the downstream side of the transport roller. In addition, it is possible to smoothly perform the switching from the release state to the nip state of the discharge roller without having an influence on the original operation of the existing transport roller.

According to a fourth aspect of the invention, there is provided an image processing apparatus including: an image processing unit that is provided at a position between a transport roller on a transport path and a discharge roller and continuously performs an image processing operation on an opposed face of a medium transported by the transport roller; and a medium transport device that switches a transport direction of the medium to allow the medium to enter a reverse path after the image process is performed on a first face of the medium, to reverse the medium such that a second face opposite to the first face is opposed to the image processing unit, wherein the medium transport device is the medium transport device according to any one of the first aspect to the third aspect.

According to the aspect, the first face transport and the second face transport are smoothly realized irrespective of differences in the lengths of the mediums by the same operation and advantages as those of any one aspect of the first aspects to the third aspect. Therefore, an image process performed on both faces of the medium is performed with high precision irrespective of differences in the lengths of the mediums.

BRIEF DESCRIPTION OF THE DRAWINGS

The invention will be described with reference to the accompanying drawings, wherein like numbers reference like elements.

FIG. 10 is a side cross-sectional view illustrating an internal structure of the paper transport device according to the embodiment of the invention, at the second face transport stopping time.

FIGS. 11A and 11B are side views illustrating an operation state of a cam driving gear and gear rows around the cam driving gear of the paper transport device according to the embodiment of the invention, at the forward rotation time of a driving motor.

FIGS. 12A and 12B are side views illustrating an operation state of the cam driving gear and the gear rows around the cam driving gear of the paper transport device according to the embodiment of the invention, at the reverse rotation time of a driving motor.

DESCRIPTION OF EXEMPLARY EMBODIMENTS

Hereinafter, a medium transport device and an image processing apparatus according to the following embodiments of the invention will be described in detail with reference to the drawings. First, a scanner 1 as an aspect for embodying the image processing apparatus provided with the medium transport device of the invention is exemplified, and an internal structure of the scanner 1 will be schematically described.

The scanner 1 in the figure is an image reading apparatus capable of continuously reading an image, printing of which is performed on both faces, a first face 3 and a second face 5 opposite to the first face 3, of a medium (hereinafter, referred to as "paper") P as a document.

Figure 1:
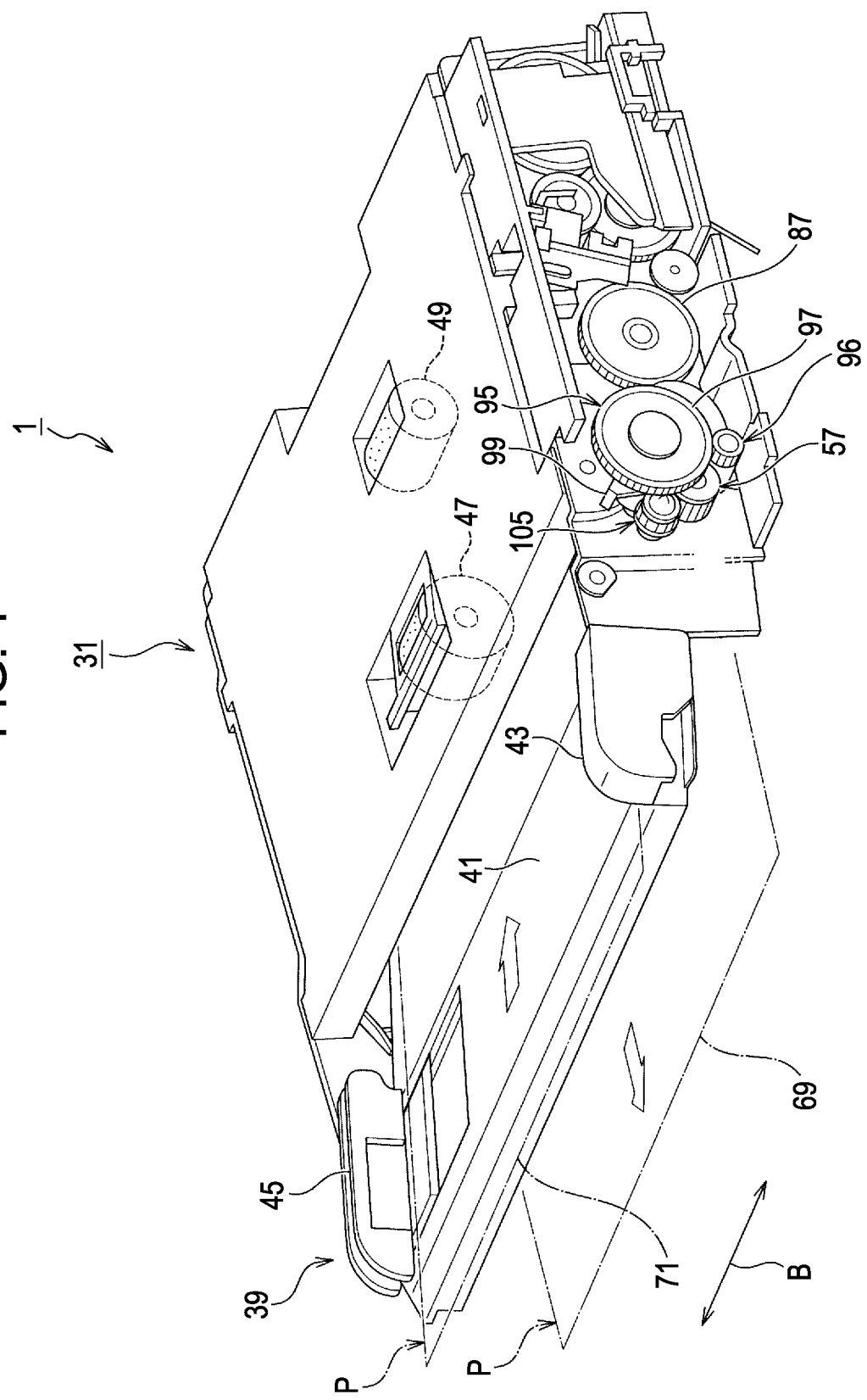
FIG. 1 is a perspective view illustrating an appearance of a paper transport device according to an embodiment of the invention.
Figure 2:
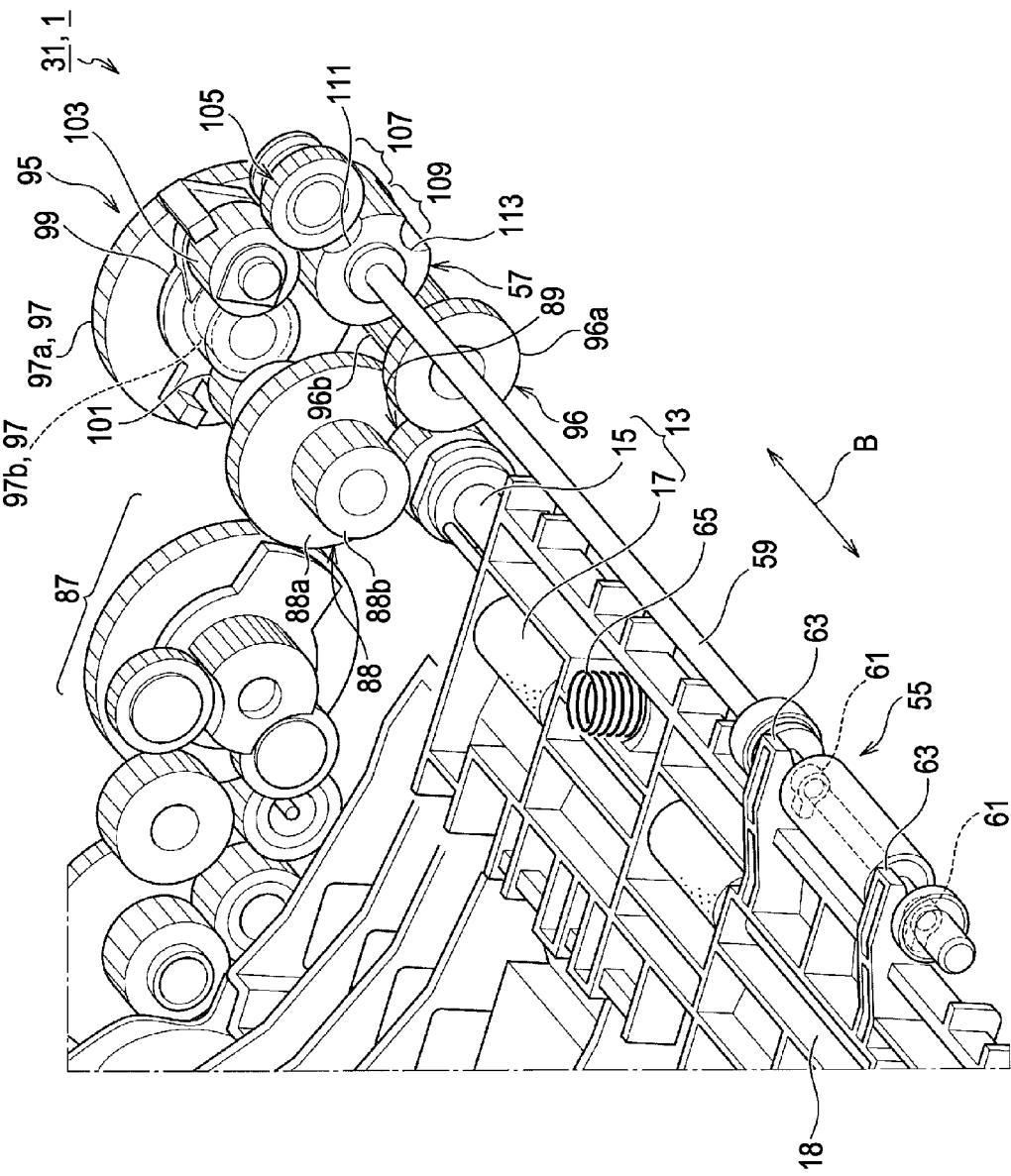
FIG. 2 is a perspective view illustrating gear rows performing operations of a nip-release switching mechanism and units of the paper transport device according to the embodiment.
Figure 3:
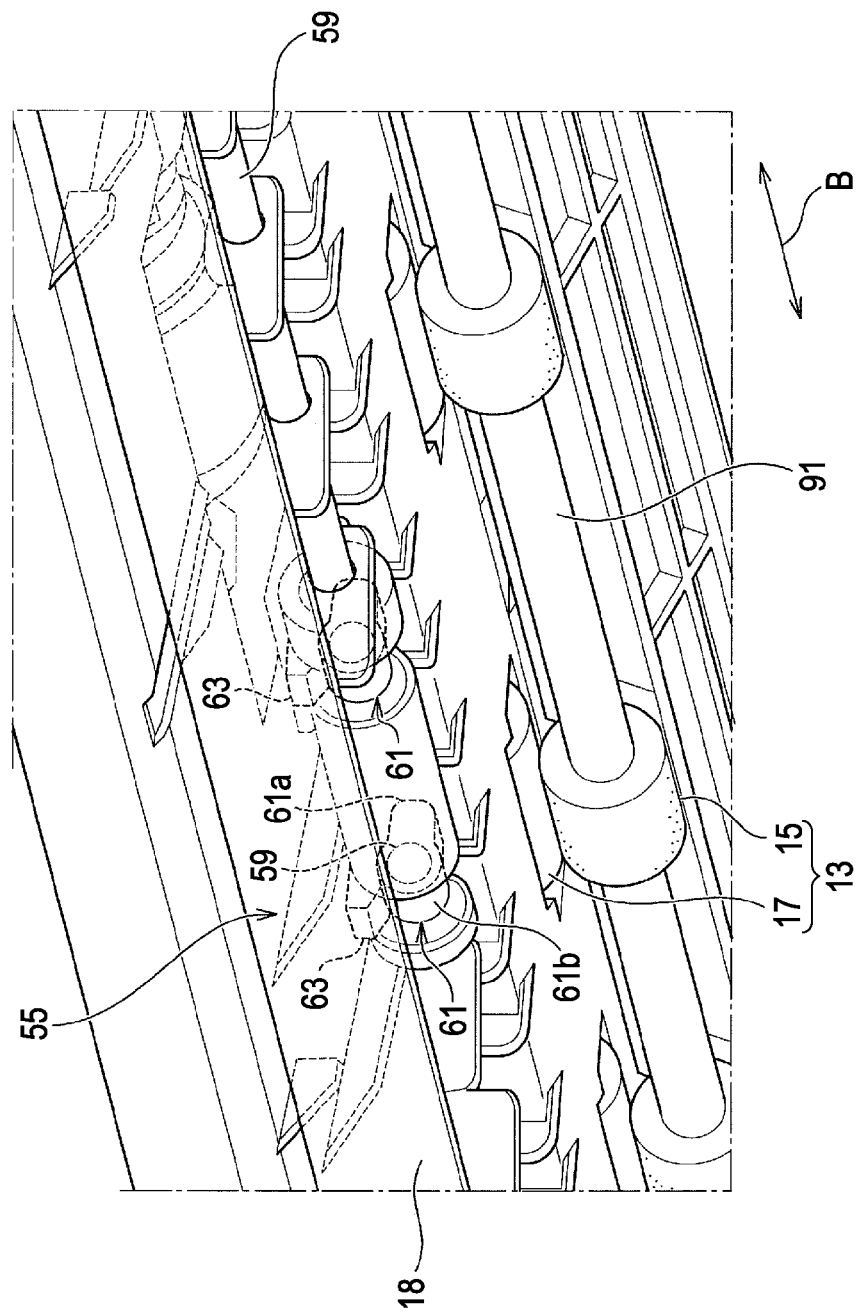
FIG. 3 is an enlarged perspective view illustrating surroundings of the nip-release switching mechanism and the discharge roller of the paper transport device according to the embodiment of the invention, as viewed from the lower right oblique side.
Figure 4:
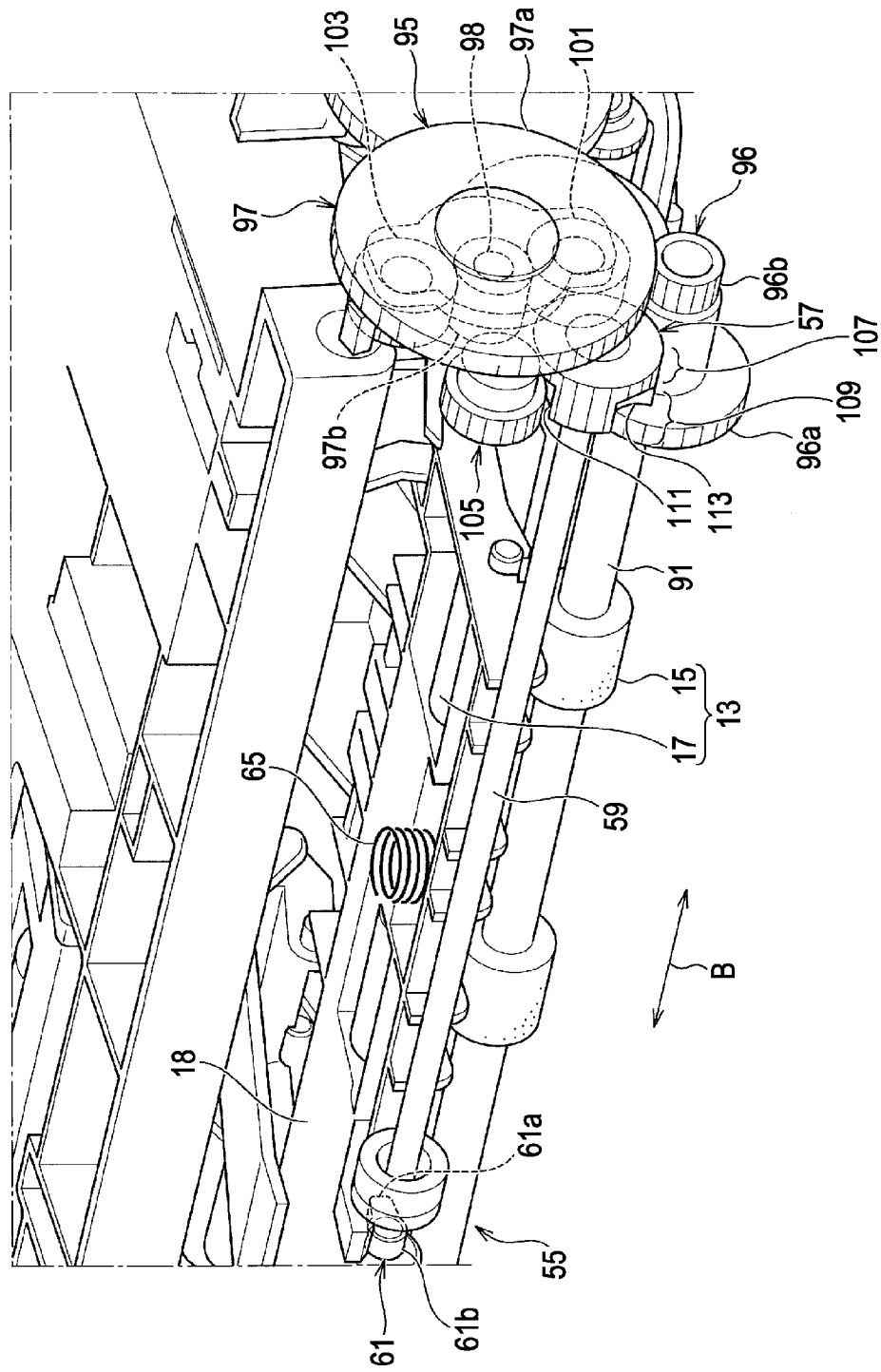
FIG. 4 is an enlarged perspective view illustrating surroundings of the nip-release switching mechanism and the discharge roller of the paper transport device according to the embodiment of the invention, as viewed from the upper right oblique side.
Figure 5:
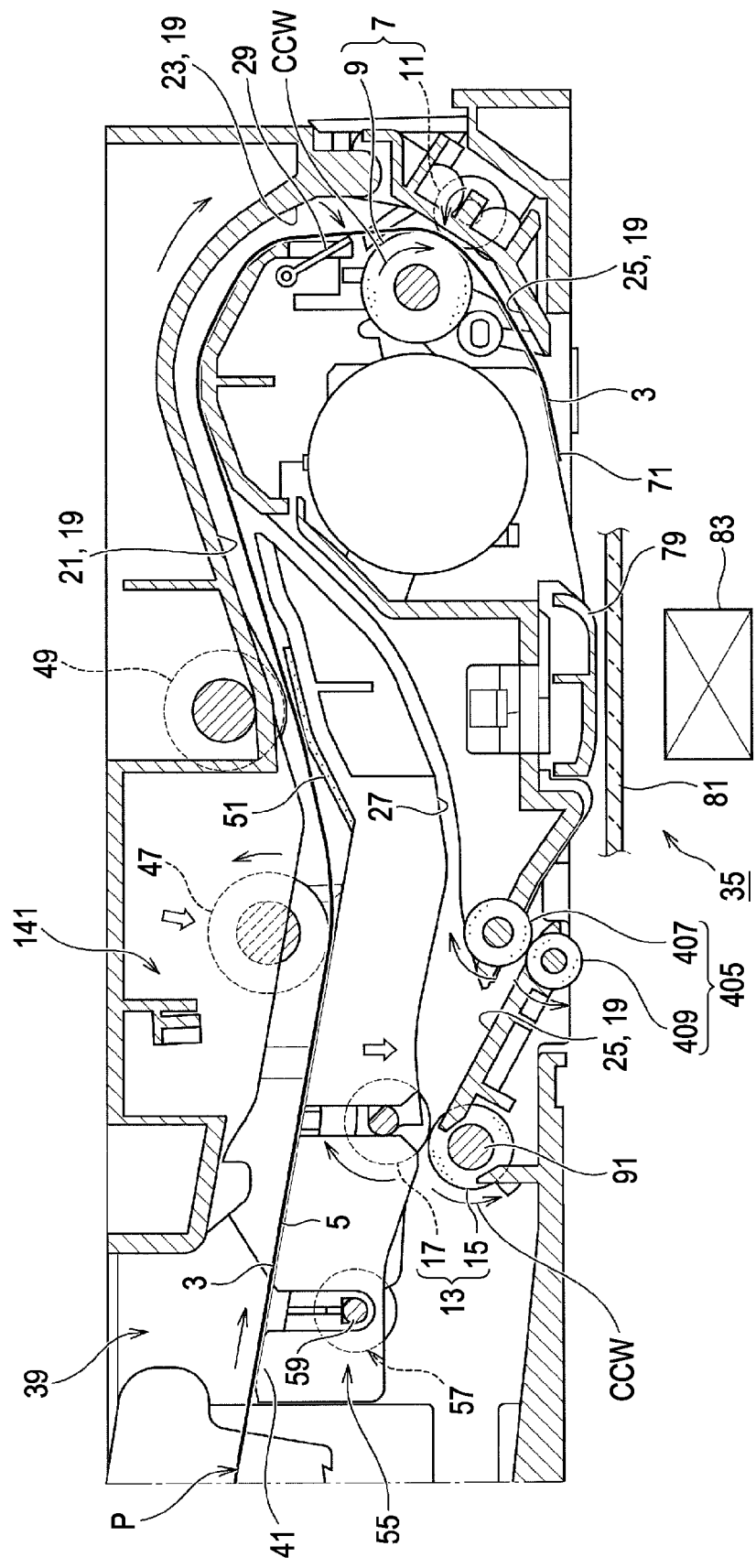
FIG. 5 is a side cross-sectional view illustrating an internal structure of the paper transport device according to the embodiment of the invention, at the first face transport time.

Specifically, as shown in FIG. 1, FIG. 2, and FIG. 5, the scanner 1 includes a medium transport device 31 in which the paper P fed with the first face 3 facing upward is guided to a semi-loop-shaped transport path 19 on which a transport roller 7 and a discharge roller 13 are provided, first face transport is performed with the first face 3 facing downward, the transport direction is switched, the paper P enter a reverse path 27 and is guided to the transport path 19 again, and second face transport is performed with the second face 5 facing downward; and an image processing unit 35 that is provided at a position between the transport roller 7 and the discharge roller 13 on the transport path 19 and continuously performs an image processing operation on the first face 3 and the second face 5 of the paper P transported by the transport roller 7.

The transport path 19 is formed of a path member in which a first transport portion 21, a rotation portion 23, and a second transport portion 25 are provided in a semi-loop shape. A feeding tray 39 provided with a placing base 41 for setting the paper P, a fixed edge guide 43 for adjusting and positioning left and right edge positions of the set paper P and a movable edge guide 45 is provided at an upstream position of the first transport portion 21.

A pick roller 47, which sequentially and continuously sends an upper paper P from a plurality of papers P set on the feeding tray 39 in a piled state, a separation roller 49 and a separation pad 51, which separate only the top paper P from the plurality of twice transported and continuously sent papers P and feed the paper P toward the transport path 19, are provided from an upper portion of a front end of the feeding tray 39 to a carrying-in portion in the first transport portion 21 of the transport path 19.

The first transport portion 21 receives the paper P fed from the feeding tray 39 for the first time. In the first transport portion 21, the paper P is transported with the first face 3 facing upward. The rotation portion 23 reverses the front face and the back face of the paper P sent from the first transport portion 21, and sends and receives it to and from the second transport portion 25. The transport roller 7 including a pair of nip rollers of a transport driving roller 9 and a transport driven roller 11 is provided at a downstream position of the rotation portion 23.

The second transport portion 25 receives the paper P, the front face and the back face of which are reversed by the rotation portion 23, transports the paper P toward the image processing unit 35, and transports the paper P toward the discharge roller 13 formed of the pair of nip rollers of the discharge driving roller 15 and the discharge driven roller 17 provided at the downstream end of the second transport portion 25. In the second transport portion 25, the paper P is transported with the first face 3 facing downward at the first face transport time, and the paper P is transported with the second face 5 facing downward at the second face transport time.

The discharge roller 13 can switch the nip state and the release state by a nip-release switching mechanism 55, and allows missing of a leading end 69 and a trailing end 71 of the paper P to occur at the nip position of the discharge roller 13 at the time of transporting the paper P with a long transport direction length.

The transport direction length is an operational length at the time of actually transporting the paper P which are different according to the size and the transport direction of the paper P. For example, when the paper P of A4 size is transported in a longitudinal direction, the transport direction length is 297 mm, and when the paper P of A4 size is transported in a transverse direction, the transport direction length is 210 mm.

In the embodiment, the longest transport direction length is set to, for example, 432 mm, and the paper P of A3 size can be transported in a longitudinal direction.

Figure 6:
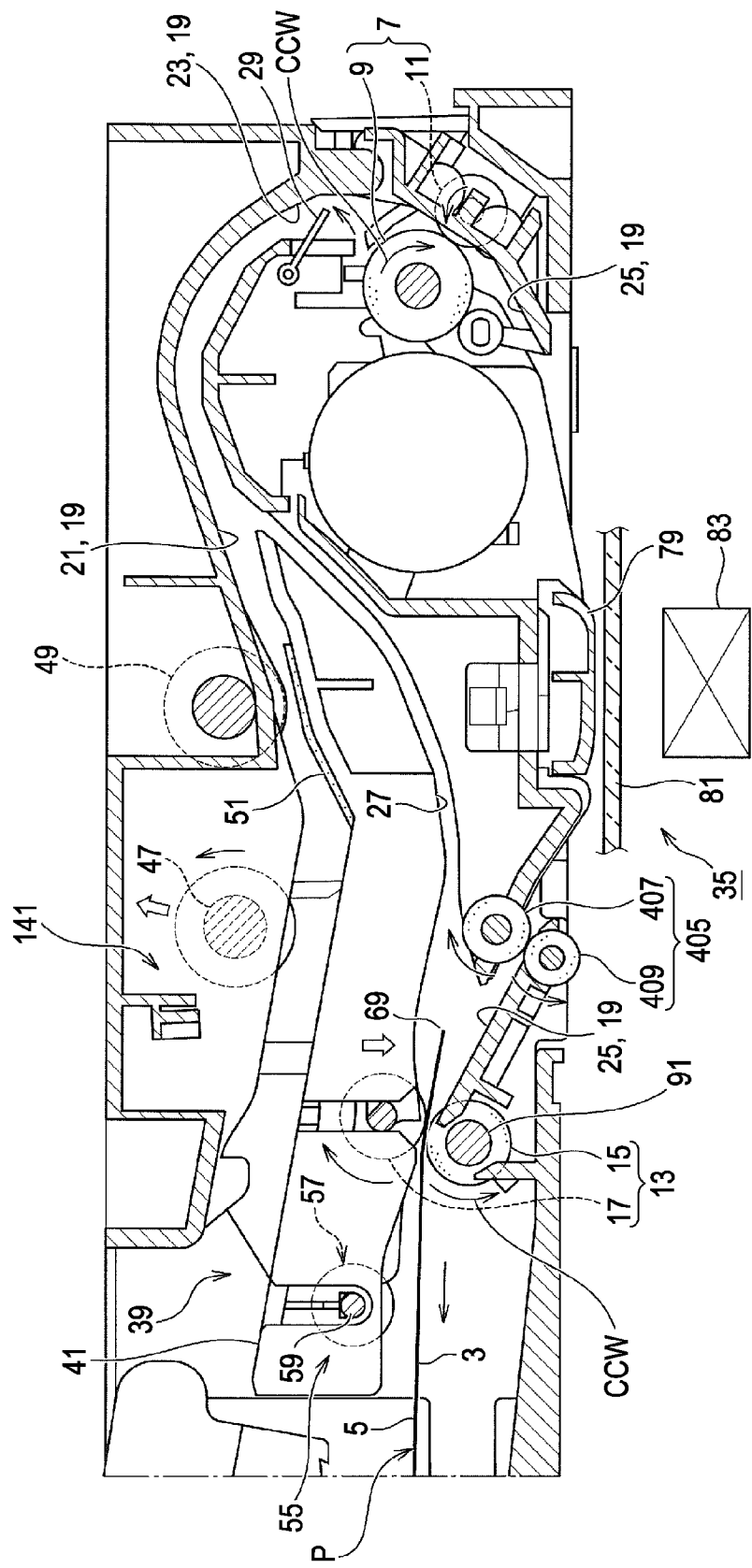
FIG. 6 is a side cross-sectional view illustrating an internal structure of the paper transport device according to the embodiment of the invention, at the first face transport completion time.
Figure 7:
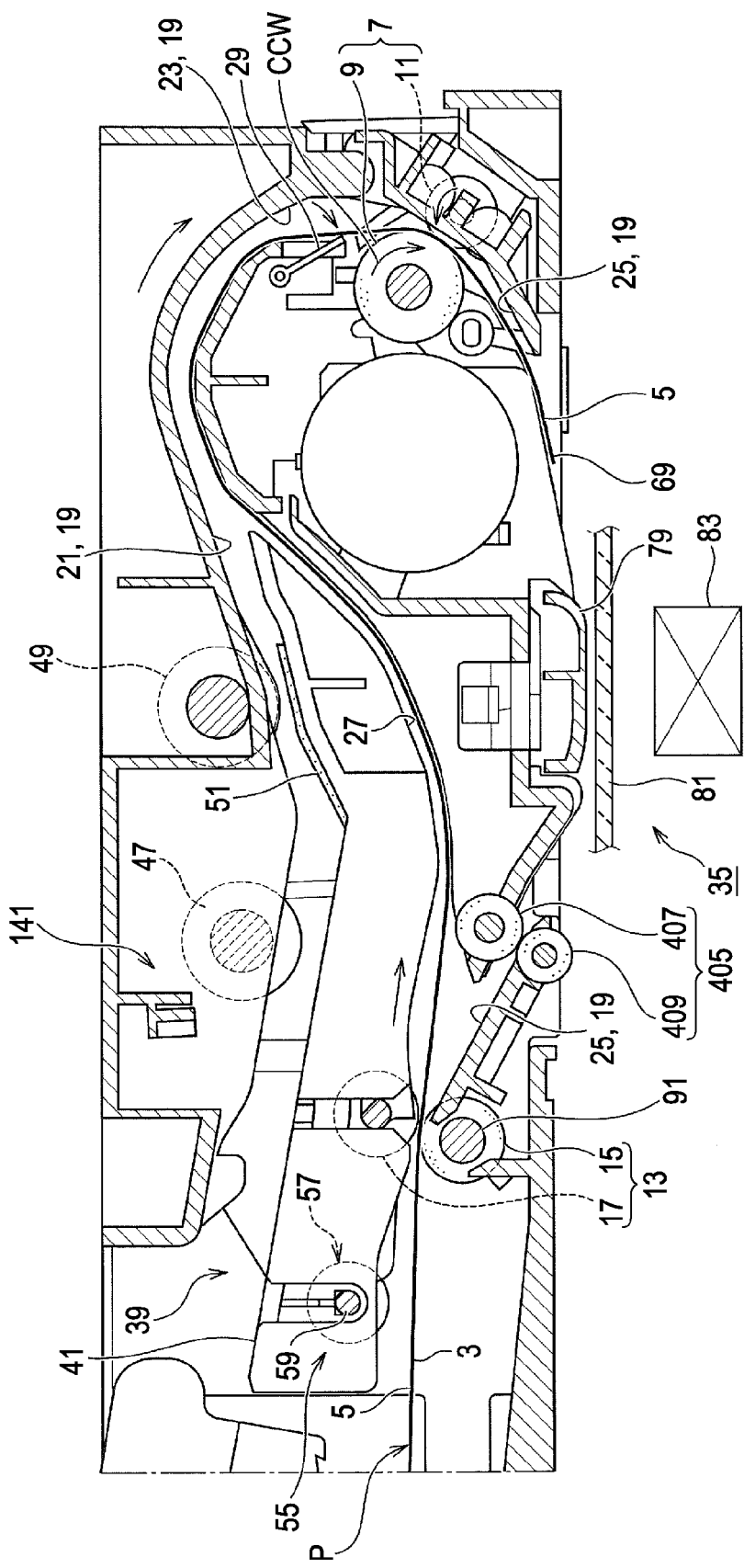
FIG. 7 is a side cross-sectional view illustrating an internal structure of the paper transport device according to the embodiment of the invention, at the first half of the second face transport time.

As shown in FIG. 6 and FIG. 7, the reverse path 27 is a path for performing the second face transport by guiding the paper P on which the first face transport is completed to the upstream portion of the rotation portion 23 of the transport path 19 again and reversing the front face and the back face of the paper P.

A detection sensor 29 that detects passing of the paper P transported along the transport path 19 is provided at the upstream position around the transport roller 7.

The image processing unit 35 basically includes a medium support portion (hereinafter, referred to as "paper support portion") 79 provided above the transported paper P and presses the paper P from the upper part to make it into a tension state and supporting the paper P, a glass plate 81 provided under the transported paper P, and an image reading unit 83 provided with a fluorescent lamp and a light receiving sensor provided in a case partitioned by the glass plate 81.

Embodiment (See FIG. 1 to FIG. 15)

The scanner 1 can be provided with a paper transport device 31 according to the following embodiment. The paper transport device 31 includes a driving motor (not shown) that can be rotated forward and in reverse, a transport roller driving gear row (not shown) that transmits the rotation of the driving motor to rotate in a forward rotation direction CCW at the normal time of the transport roller 7, and a discharge roller driving gear row 87 that transmits the rotation of the driving motor to rotate in a reverse rotation direction CW opposite to the forward rotation direction CCW of the discharge roller 13.

The paper transport device 31 includes a cam driving gear 57 that is provided with a partial tooth portion 109 having a non-tooth portion 111 for a home position and a non-tooth portion 113 for a release position at a part of a circumferential face and a whole tooth portion 107 provided with teeth on the whole circumferential face; an intermediate gear 105 that is provided at a position engaged with the partial tooth portion 109; a planetary gear mechanism 95 that is provided with a first planetary gear 101 engaged with the whole tooth portion 107 of the cam driving gear 57 at the reverse rotation time of the driving motor to transmit power and a second planetary gear 103 engaged with the intermediate gear 105 at the forward rotation time of the driving motor to transmit the rotation power in the same direction as that of the first planetary gear 101 to the partial tooth portion 109 of the cam driving gear 57; and a nip-release switching mechanism 55 that switches the nip state and the release state of the discharge roller 13 by the rotation position of the cam driving gear 57.

In a state where a second power transmission path 403 of transmitting power from the second planetary gear 103 to the cam driving gear 57 through the intermediate gear 105 is selected, when the intermediate gear 105 is opposed to the non-tooth portion 113 for the release position of the cam driving gear 57, the rotation direction of the driving motor is switched to select a first power transmission path 401 directly transmitting power from the first planetary gear 101 to the cam driving gear 57, the non-tooth portion 113 for the release position deviates from the opposed position of the intermediate gear 105, and the rotation direction of the driving motor is switched again to select the second power transmission path 403.

The transport roller driving gear row is a gear row transmitting the rotation of the driving motor to the transport driving roller 9. The transport roller driving gear row is provided with a mechanism to rotate the transport driving roller 9 in the forward rotation direction CCW at the normal time even when the driving motor is switched between the forward rotation direction CCW and the reverse rotation direction CW. Specifically, basically the same mechanism as the mechanism rotating the cam driving gear 57 in a regular direction by combining the planetary gear mechanism 95 and the intermediate gear 105 is provided as an example.

The discharge roller driving gear row 87 is a gear row transmitting the rotation of the driving motor in the forward rotation direction CCW and the reverse rotation direction CW to the discharge driving roller 15. Specifically, a first transmission gear 88 provided integrally with a large diameter gear portion 88a and a small diameter gear portion 88b is provided at the end of the discharge roller driving gear row 87. The discharge roller driving gear 89 provided at one end of a discharge roller driving shaft 91 is engaged with the small diameter gear portion 88b of the first transmission gear 88, and the rotation of the discharge roller driving gear 89 is transmitted to the discharge driving roller 15 as it is through the discharge roller driving shaft 91.

Figure 9:
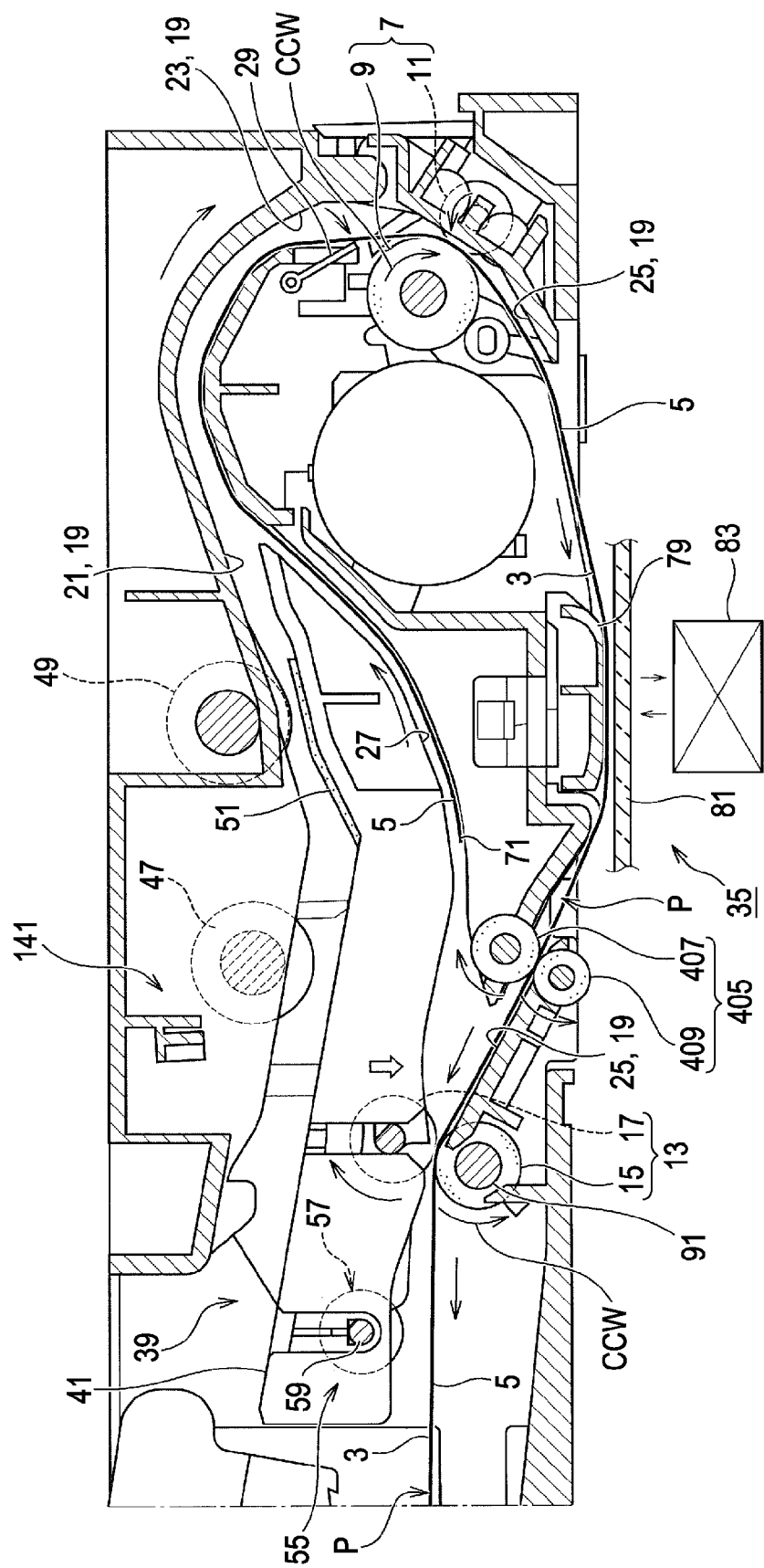
FIG. 9 is a side cross-sectional view illustrating an internal structure of the paper transport device according to the embodiment of the invention, at the last half of the second face transport time.

When the paper P supplied to the second transport portion 25 is discharged to the outside, the discharge driving roller 15 is rotated in the forward rotation direction CCW as shown in FIG. 5 and FIG. 9. When the first face transport is completed and the paper P moved to the position shown in FIG. 6 is allowed to enter the reverse path 27 as shown in FIG. 7, the discharge driving roller 15 is rotated in the reverse rotation direction CW as shown in FIG. 7.

The nip-release switching mechanism 55 basically includes the cam driving gear 57 to which power is transmitted through the planetary gear mechanism 95 and the intermediate gear 105, a cam shaft 59 to which the cam driving gear 57 is provided at one end thereof and extends horizontally toward the center of a width direction B of the transport path 19, for example, two cams 61 and 61 that are provided at the other end of the cam shaft 59, for example, two cam followers 63 and 63 coming in contact with the two cams 61 and 61, respectively, a roller holder 18 for the discharge driven roller 17 that is provided integrally with the two cam followers 63 and 63 and is swung in a predetermined angle range about a swing shaft (not shown), and a pressing member 65 that is formed of a compressed coil spring as an example of pressing an upper face of a swing-free end side of the roller holder 18 to press the discharge driven roller 17 to the discharge driving roller 15.

Figure 13:
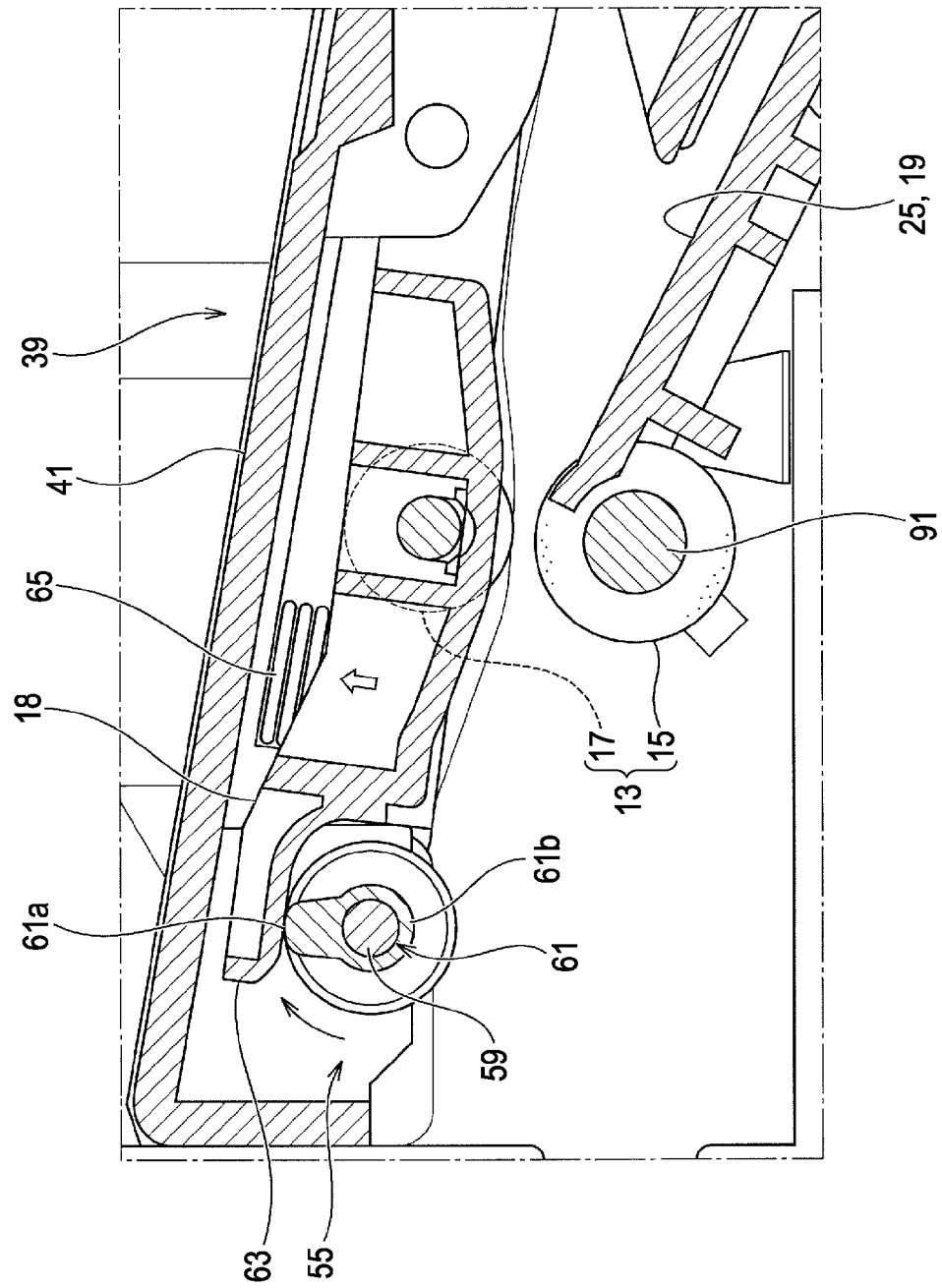
FIG. 13 is an enlarged cross-sectional side view illustrating surroundings of the nip-release switching mechanism and the discharge roller of the paper transport device according to the embodiment of the invention, in the release state of the discharge roller.
Figure 14:
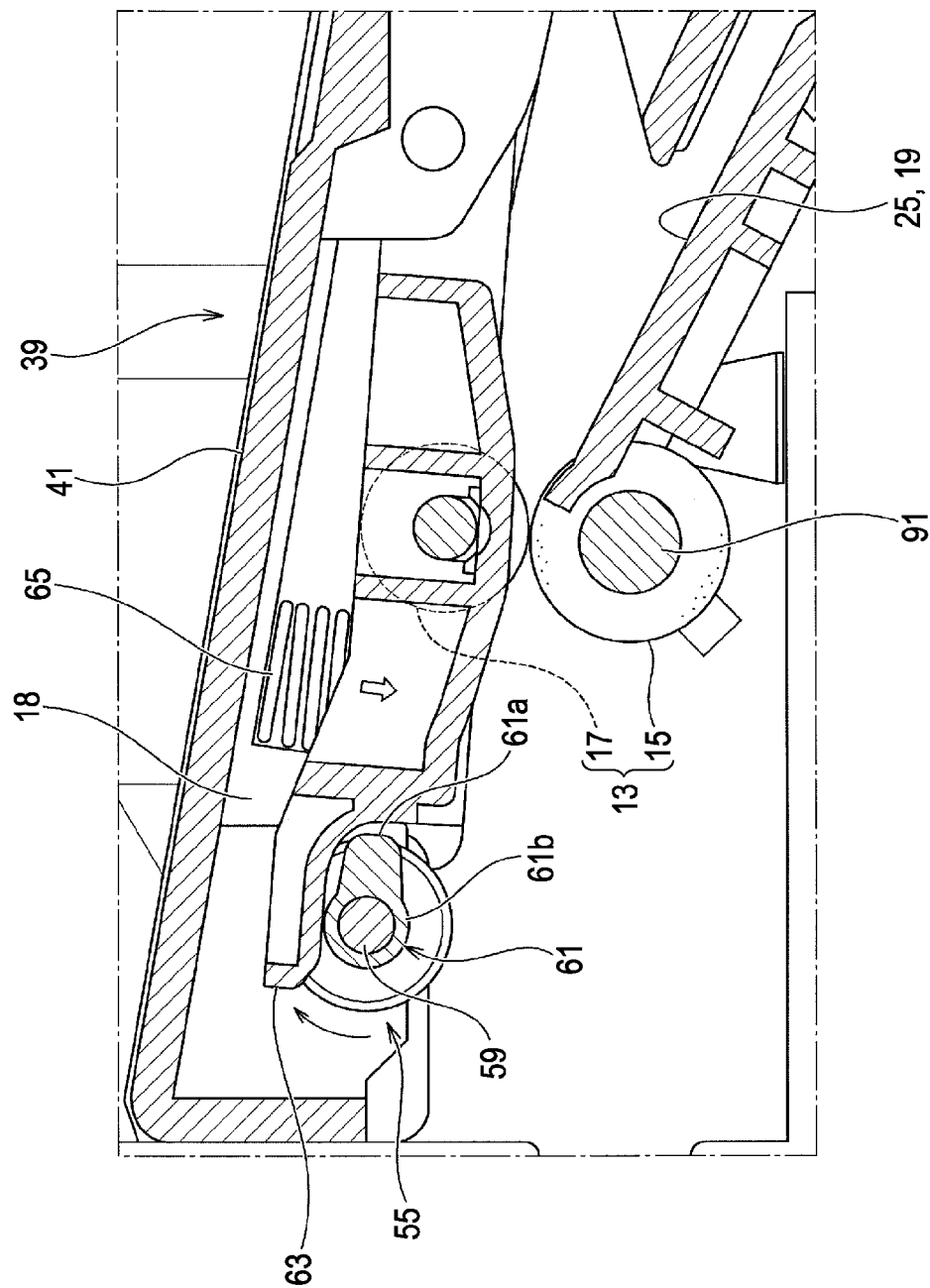
FIG. 14 is an enlarged side cross-sectional view illustrating surroundings of the nip-release switching mechanism and the discharge roller of the paper transport device according to the embodiment of the invention, in the nip state of the discharge roller.

At a position shown in FIG. 13 where a highest front end 61a of the cam 61 comes in contact with the cam follower 63, the discharge roller 13 becomes the release state. At a position shown in FIG. 14 where a lowest base end 61b of the cam 61 comes in contact with the cam follower 63, the transport roller 13 is transferred to the nip state. The cam driving gear 57 is always rotated in a regular direction even when the rotation direction of the driving motor is switched in the middle by the operation of the planetary gear mechanism 95 and the intermediate gear 105.

When the cam driving gear 57 rotates one revolution, the optimal switching time of the nip state and the release state of the discharge roller 13 can be obtained when the paper P having the longest usable transport direction length is transported.

The planetary gear mechanism 95 basically includes the second transmission gear 96 that is provided integrally with a large diameter gear portion 96a rotating by engaging with the discharge roller driving gear 89 and a small diameter gear portion 96b, a sun gear 97 that is provided integrally with a large diameter gear portion 97a engaged with the small diameter gear portion 96b and a small diameter gear portion 97b, a swing arm 99 that is swung and rotated around a rotation shaft 98 of the sun gear 97, a first planetary gear 101 that is shaft-supported to one end of the swing arm 99, and a second planetary gear 103 that is shaft-supported to the other end of the swing arm 99.

The first planetary gear 101 and the second planetary gear 103 are engaged with the small diameter gear portion 97b with the small diameter gear portion 97b of the sun gear 97 interposed therebetween.

The first planetary gear 101 swings the swing arm 99 in the engaging direction of the first planetary gear 101 with the cam driving gear 57 when the driving motor is rotated in the reverse rotation direction CW, and transmits power to the cam driving gear 57 to rotate it in a predetermined direction.

The second planetary gear 103 swings the swing arm 99 in a direction opposite to the previous direction when the driving motor is rotated in the forward rotation direction CCW, and transmits power to the cam driving gear 57 through the intermediate gear 105 to rotate it in the same direction as that when the driving motor is rotated in the reverse rotation direction CW.

An intermediate roller 405 formed of a pair of nip rollers and capable of rotating forward and in reverse is provided on the transport path 19 of the downstream side of the transport roller 7 from the nip point of the transport roller 7 to the nip position of the discharge roller 13.

The intermediate roller 405 is provided with an intermediate driving roller 407 and an intermediate driven roller 409. When the passing of the trailing end 71 of the transported paper P is detected by the detection sensor 29, the transport is stopped immediately before the intermediate roller 405 after the trailing end 71 of the paper P passes through the image reading unit 83 on the basis of the detection information.

At the same time, the rotation direction of the driving motor becomes the reverse rotation direction CW, thereby switching the power transmission path from the second power transmission path 403 to the first power transmission path 401. The power is applied to the cam driving gear 57 again, and thus the intermediate gear 105 deviates from the non-tooth portion 113 for the release position placed at the opposed position.

The rotation direction of the driving motor is switched to the forward rotation direction CCW again, thereby selecting the second power transmission path 403. The rotation position of the cam driving gear 57 proceeds to lower the discharge driven roller 17, the discharge roller 13 is made into the nip state shown in FIG. 14, and the paper P can be discharged to the outside of the transport path 19 by the rotation in the forward rotation direction CCW of the discharge roller 13.

Next, an operation aspect of the paper transport device 31 according to the embodiment with such a configuration is divided into (1) the first face transport time and (2) the second face transport time, and the medium transport method of the invention performed by using the paper transport device 31 will be described in the description of the above (2) second face transport time.

In the medium transport method of the invention, the paper P supplied toward the nip point of the transport roller 7 by the discharge roller 13 passes through the nip point of the transport roller 7, and is transported to return to the nip position of the discharge roller 13 again. The medium transport method basically includes a second power transmission transport process, a second power blocking process, a non-tooth portion escaping process, and a second power transmission discharge process.

1. First Face Transport Time (see FIG. 3 to FIG. 6, FIG. 11, and FIG. 14)

The paper P set in the feeding tray 39 with the first face 3 facing upward is continuously sent by the pick roller 47 and is separated from the following paper P by the separation roller 49 and the separation pad 51, and only the one top paper P is fed to the transport path 19.

The paper P fed to the transport path 19 is sent to the first transport portion 21 with the first face 3 facing upward by receiving transport power of the pick roller 47, the front face and the back face thereof are reversed at the rotation portion 23, and the paper P is sent to the transport roller 7 with the first face 3 facing downward.

At the first face transport time, the driving motor is rotated in the forward rotation direction CCW, the rotation indicated by the arrow shown in FIG. 11 is transmitted to the gear row, and the discharge roller driving gear 89 is rotated in the forward rotation direction CCW to discharge the paper P to the outside.

The sun gear 97 of the planetary gear mechanism 95 is rotated clockwise in FIG. 11 to engage the second planetary gear 103 with the intermediate gear 105, thereby rotating the intermediate gear 105. At this time, since the intermediate gear 105 is opposed to the non-tooth portion 111 for the home position, the power is not transmitted to the cam driving gear 57, and the discharge roller 13 keeps the nip state shown in FIG. 14.

The paper P supplied to the nip point of the transport roller 7 is transported toward the image processing unit 35 of the second transport portion 25 by the rotation in the forward rotation direction CCW transmitted through the transport roller driving gear row (now shown), with the first face 3 facing downward.

In the image processing unit 35, the image printed on the first face 3 of the paper P is sequentially read from the transport start side to the transport end side of the paper P according to the transport of the paper P by the image reading unit 83, and stored as image information.

When the paper P reaches the nip point of the discharge roller 13, the paper P is discharged to the outside of the transport path 19 by the rotation in the forward rotation direction CCW of the discharge roller 13, and the discharge is stopped as shown in FIG. 6.

2. Second Face Transport Time (see FIG. 6 to FIG. 15)

When the paper P reaches the state shown in FIG. 6, the rotation of the driving motor is switched to the reverse rotation direction CW. Accordingly, in FIG. 15, the discharge roller 13 keeps the nip state at the position shown in S1 and is rotated in the reverse rotation direction CW, the paper P being discharged to the outside of the transport path 19 is guided to the reverse path 27, and the second face transport is started as shown in FIG. 7.

The power transmission when the driving motor is rotated in the reverse rotation direction CW is as shown in FIG. 12, and the rotation indicated by the arrow shown in FIG. 12 is transmitted to the gear row. Accordingly, the rotation in the reverse rotation direction CW is transmitted to the discharge roller driving gear 89 to allow the paper P to enter the reverse path 27.

The sun gear 97 of the planetary gear mechanism 95 is rotated anticlockwise in FIG. 12 to directly engage the first planetary gear 101 with the whole tooth portion 107 of the cam driving gear 57, thereby selecting the first power transmission path 401, and the cam driving gear 57 is rotated anticlockwise in FIG. 12.

Figure 15:
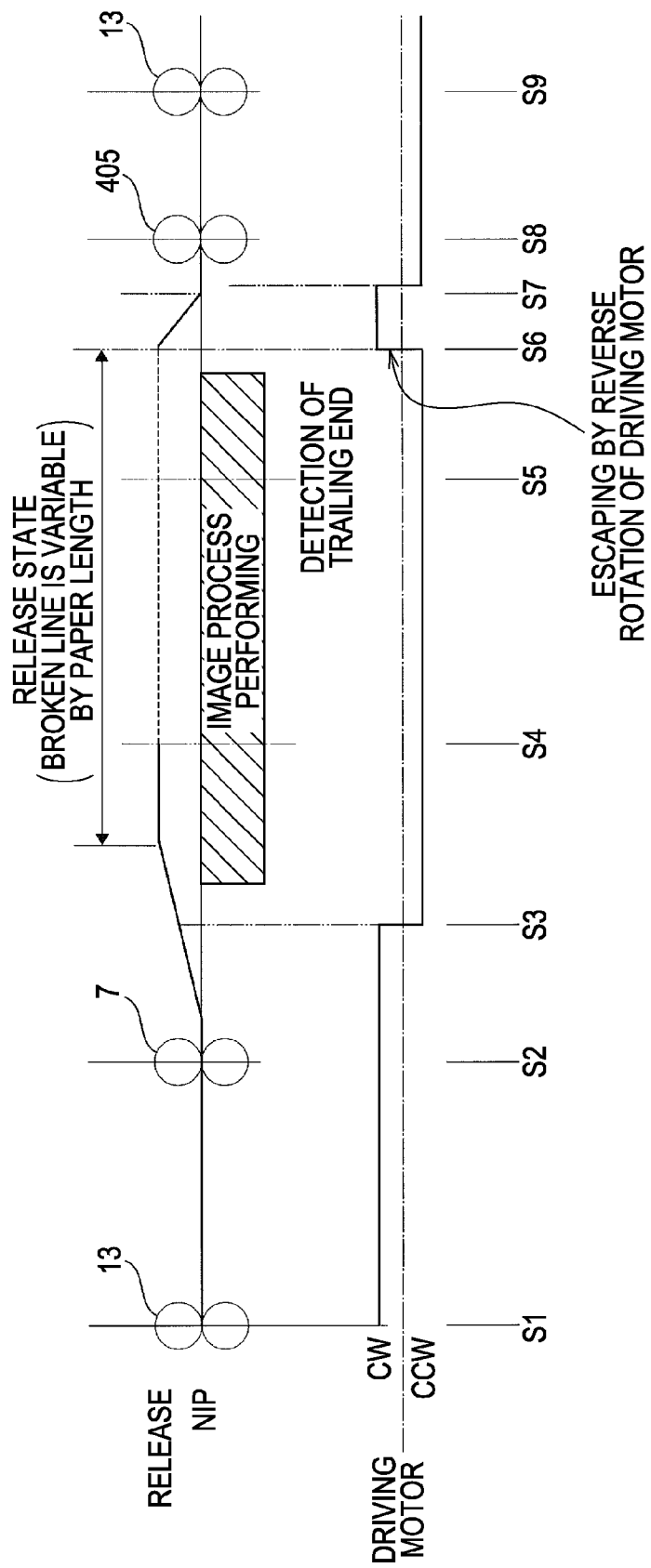
FIG. 15 is a diagram illustrating an operation at the second face transport time of the paper transport device according to the embodiment of the invention.

The paper P entering the reverse path 27 with the second face 5 facing upward is supplied to the upstream position of the rotation portion 23 of the transport path 19, the front face and the back face thereof are reversed by the rotation portion 23, the paper P is sent to the transport roller 7 at the position shown in S2 of FIG. 15 with the second face 5 facing downward.

The transport roller 7 is rotated in the forward rotation direction CCW at normal times even when the rotation direction of the driving motor is changed by the transport roller driving gear row (not shown), and thus pinches and transports the sent paper P toward the image processing unit 35 on the downstream side.

Although not shown in FIG. 15, the rotation of the driving motor is temporarily switched to the forward rotation direction CCW at the position immediately after the leading end 69 of the paper P passes through the transport roller 7. Skew (slope) occurring in the process of transporting the paper P by the temporary switching of the rotation direction of the transport roller 7 is taken, and the paper P can be supplied to the image processing unit 35 in a normal positioning.

After the skew is taken, the discharge roller 13 starts moving toward the release state by the rotation of the cam driving gear 57 receiving the power from the first planetary gear 101.

When the leading end 69 of the paper P reaches the middle part between the transport roller 7 and the image processing unit 35 shown in FIG. 7, the rotation direction of the driving motor is changed from the reverse rotation direction CW to the forward rotation direction CCW at the position shown in S3 of FIG. 15. The medium transport method of the invention is transferred to the second power transmission transport process, the cam driving gear 57 is rotated, and the discharge roller 13 is gradually transferred to the release state.

In the second power transmission transport process, power is transmitted from the second planetary gear 103 to the partial tooth portion 109 of the cam driving gear 57 through the intermediate gear 105 to transport the paper P.

Figure 8:
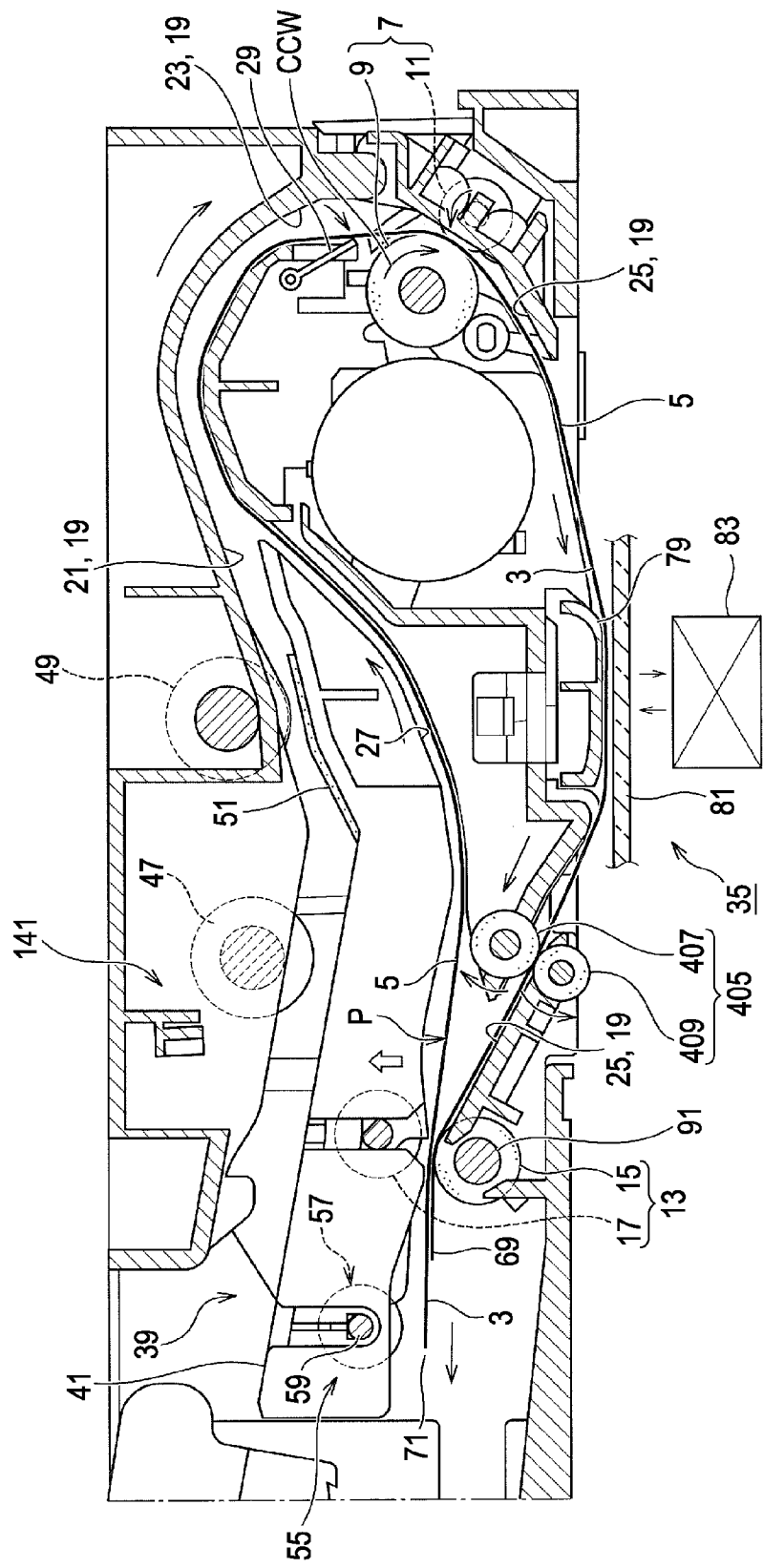
FIG. 8 is a side cross-sectional view illustrating an internal structure of the paper transport device according to the embodiment of the invention, at the middle of the second face transport time.

For the paper P passing through the nip point of the transport roller 7, reading of the image information on the second face 5 is started in the image processing unit 35. In a state where the leading end 69 of the paper P reaches the nip position of the discharge roller 13, the discharge roller 13 is transferred to the release state, and the second face transport is performed in a state where missing of the paper P is possible as shown in FIG. 8.

When the paper P is transported and the cam driving gear 57 is rotated, the non-tooth portion 113 for the release position is located at the opposed position of the intermediate gear 105. The process is transferred to the second power blocking process of the medium transport method of the invention, and the rotation of the cam driving gear 57 is stopped at the position shown in S4 of FIG. 15 to keep the release state of the discharge roller 13.

In the second power blocking process, the non-tooth portion 113 for the release position formed at a part of the circumferential face of the partial tooth portion 109 is opposed to the intermediate gear 105 to stop the rotation of the cam driving gear 57.

The time when the discharge roller 13 is released is different according to the transport direction length of the paper P. The time is longer for paper P having the longer transport direction length, and the time is shorter for the paper P having the shorter transport direction length. The reading of the image information on the second face 5 in the image processing unit 35 continues even at the position shown in S5 of FIG. 15.

The paper P from which the image information is read is further transported toward the downstream side, and is supplied to the nip point of the intermediate roller 405. The paper P is sequentially discharged from the nip position of the discharge roller 13 in the release state to the outside of the transport path 19 by pinching and transporting operations of the intermediate driving roller 407 and the intermediate driven roller 409.

When the trailing end 71 of the paper P reaches the upstream side of the transport roller 7, the detection sensor 29 detects the trailing end 71 of the paper P. After the reading of the image information is completed, the transport of the paper P is stopped at the position indicated by S6 in FIG. 15 immediately before the nip point of the intermediate roller 405.

The rotation direction of the driving motor is switched to the reverse rotation direction CW from the position indicated by S6 to the position indicated by S7 in FIG. 15, the process is transferred to the non-tooth portion escaping process of the medium transport method of the invention, and the non-tooth portion 113 for the release position deviates from the opposed position of the intermediate gear 105. The discharge roller 13 is transferred from the release state to the nip state between the position indicated by S6 and the position indicated by S7, and the transferring is completed.

In the non-tooth escaping process, the rotation direction of the driving motor is changed to transmit power from the first planetary gear 101 to the whole tooth portion 107 of the cam driving gear 57, and the non-tooth portion 113 for the release position is escaped from the opposed position of the intermediate gear 105.

After the non-tooth portion escaping process, the process is transferred to the second power transmission discharge process of the medium transport method of the invention at the same position indicated by S7 in FIG. 15, the rotation direction of the driving motor is switched to the forward rotation direction CCW again to select the second power transmission path 403, the rotation of the cam driving gear 57 proceeds, and the paper P is sent in the discharge direction by the discharge roller 13 in the nip state.

In the second power transmission discharge process, the rotation direction of the driving motor is changed again to transmit power from the second planetary gear 103 to the partial tooth portion 109 of the cam driving gear 57 through the intermediate gear 105, and the paper P is discharged.

In the nip state of the discharge roller 13, the trailing end of the paper P passes through the nip position of the intermediate roller 405 at the position indicated by S8 in FIG. 15, and receives the transport power of the discharge roller 13 indicated by S9 in FIG. 15, and the paper P is sequentially discharged to the outside of the transport path 19.

In this case, the paper P discharged from the discharge roller 13 is discharged in the positioning with the first face 3 facing upward. In order to discharge the paper P in the positioning with the second face 5 facing upward, the second face transport of the above (2) may be performed again in a state where the image processing unit 35 is not operated.

According to the embodiment as described above, the first face transport and the second face transport of various kinds of papers P having different transport direction lengths can be smoothly realized by the simple configuration of providing the intermediate roller 405, and it is possible to continuously read the images of the first face 3 and the second face 5.

Other Embodiment

The medium transport device 31 and the image processing apparatus 1 according to the invention basically have the above-described configuration, but a partial configuration may be modified and omitted within the scope which does not deviate from the concept of the invention.

For example, the medium transport device 31 of the invention is not limited to the image reading device such as the scanner performing the continuous image reading of the first face 3 and the second face 5 of the paper P, and may be an image reading device such as a scanner performing image reading of only any one face of the first face 3 and the second face 5 of the paper P. The medium transport device 31 is not limited to such an image reading device, and may be applied to the image processing apparatus 1 performing various image process operations on both faces of the first face 3 and the second face 5 of the paper P or only any one face thereof, for example, an image printing apparatus such as an ink jet printer continuously performing a printing process on both faces of the first face 3 and the second face 5 of the paper P or only any one face of the first face 3 and the second face 5.

In addition, when the medium transport device 31 of the invention is applied to the ink jet printer, for example, a printing head may be provided above the image processing unit 35, and a paper support portion may be provided under the image processing unit 35.

As the other aspect of the image processing unit 35, an image checking device that checks whether or not there is a content printed on the paper P, or whether it is right or error, or a colorimetric machine that obtains color information from colorimetric pattern printed on the paper P may be employed. In addition, the image processing unit 35 may be not provided, and the medium transport device 31 may be used as a single unit.

The position of the detection sensor 29 provided in the embodiment is not limited to the upstream position of the transport roller 7, and the detection sensor 29 may be provided on the transport path 19 immediately before the nip point of the intermediate roller 405 from the nip point of the transport roller 7. The intermediate roller 405 may not be provided. In this case, the transport roller 7 performs the function of the intermediate roller 405, and thus the position of the detection sensor 29 is the upstream position of the transport roller 7 as described in the embodiment.

In order to cope with a paper P having a shorter transport direction length, plural sets of intermediate roller 405 may be provided or a separate guide roller may be added. The medium P that is a transport target is not limited to the paper P, and may be a synthesis resin film such as a polyester film. The image represented on the first face 3 and the second face 5 of the medium P may be design or pattern in which drawing pattern or the like is expressed on the surface by filtering like Japanese paper, in addition to images such as characters, drawings, patterns, and photographs directly printed by the image printing apparatus or the like.

What is claimed is:

1. A medium transport device provided with a reverse path and a transport path disposed in a loop shape such that a medium fed toward a nip point of a transport roller by a discharge roller passes through the nip point and returns to a nip position of the discharge roller again, the medium transport device comprising:

a driving motor that rotates forward and in reverse;

a cam driving gear that is provided with a partial tooth portion having a non-tooth portion for a release position at a part of a circumferential face and a whole tooth portion provided with teeth on the whole circumferential face;

an intermediate gear that is provided at a position engaged with the partial tooth portion of the cam driving gear;

a planetary gear mechanism that is provided with a first planetary gear engaged with the whole tooth portion of the cam driving gear to transmit power when the driving motor is rotated in one direction, and a second planetary gear engaged with the intermediate gear to transmit power of rotation in the same direction as that of the first planetary gear to the partial tooth portion of the cam driving gear when the driving motor is rotated in the other direction; and a nip-release switching mechanism that switches a nip state and a release state of the discharge roller by the rotation position of the cam driving gear, wherein in a state where a second power transmission path of transmitting power from the second planetary gear to the cam driving gear through the intermediate gear is selected, when the intermediate gear is opposed to the non-tooth portion for the release position of the cam driving gear, the rotation direction of the driving motor is changed to select a first power transmission path of directly transmitting power from the first planetary gear to the cam driving gear, the non-tooth portion for the release position deviates from the opposed position of the intermediate gear, and the rotation direction of the driving motor is changed again to select the second power transmission path.

2. The medium transport device according to claim 1, wherein the time of switching from the second power transmission path to the first power transmission path is set on the basis of detection information of a detection sensor that detects a transport rear end position of the medium during transport.

3. The medium transport device according to claim 1, wherein an intermediate roller that is formed of a pair of nip rollers and is capable of rotating forward and in reverse is provided on a transport path on a downstream side of the transport roller from the nip point of the transport roller to the nip position of the discharge roller.

4. An image processing apparatus comprising:

an image processing unit that is provided at a position between a transport roller on a transport path and a discharge roller and continuously performs an image processing operation on an opposed face of a medium transported by the transport roller; and a medium transport device that changes a transport direction of the medium to allow the medium to enter a reverse path after the image process is performed on a first face of the medium, to reverse the medium such that a second face opposite to the first face is opposed to the image processing unit, the medium transport device including:

a driving motor that rotates forward and in reverse;

a cam driving gear that is provided with a partial tooth portion having a non-tooth portion for a release position at apart of a circumferential face and a whole tooth portion provided with teeth on the whole circumferential face;

an intermediate gear that is provided at a position engaged with the partial tooth portion of the cam driving gear;

a planetary gear mechanism that is provided with a first planetary gear engaged with the whole tooth portion of the cam driving gear to transmit power when the driving motor is rotated in one direction, and a second planetary gear engaged with the intermediate gear to transmit power of rotation in the same direction as that of the first planetary gear to the partial tooth portion of the cam driving gear when the driving motor is rotated in the other direction; and a nip-release switching mechanism that switches a nip state and a release state of the discharge roller by the rotation position of the cam driving gear, wherein in a state where a second power transmission path of transmitting power from the second planetary gear to the cam driving gear through the intermediate gear is selected, when the intermediate gear is opposed to the non-tooth portion for the release position of the cam driving gear, the rotation direction of the driving motor is changed to select a first power transmission path of directly transmitting power from the first planetary gear to the cam driving gear, the non-tooth portion for the release position deviates from the opposed position of the intermediate gear, and the rotation direction of the driving motor is changed again to select the second power transmission path.

5. The image processing apparatus according to claim 4, wherein the time of switching from the second power transmission path to the first power transmission path is set on the basis of detection information of a detection sensor that detects a transport rear end position of the medium during transport.

6. The image processing apparatus according to claim 4, wherein an intermediate roller that is formed of a pair of nip rollers and is capable of rotating forward and in reverse is provided on a transport path on a downstream side of the transport roller from a nip point of the transport roller to a nip position of the discharge roller.

* * * * *